(12) United States Patent
Backhus et al.

(10) Patent No.: US 11,665,096 B2
(45) Date of Patent: May 30, 2023

(54) ENTITY RELATIONSHIP ESTIMATION APPARATUS, ENTITY RELATIONSHIP ESTIMATION METHOD, AND RECORDING MEDIUM

(71) Applicant: Hitachi, Ltd., Tokyo (JP)

(72) Inventors: Jana Backhus, Tokyo (JP); Satoshi Kaneko, Tokyo (JP); Shinichi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/471,994

(22) Filed: Sep. 10, 2021

(65) Prior Publication Data

US 2022/0109634 A1  Apr. 7, 2022

(30) Foreign Application Priority Data

Oct. 7, 2020  (JP) .............................. JP2020-169823

(51) Int. Cl.
*H04L 47/22* (2022.01)
*H04L 45/02* (2022.01)
*H04L 47/125* (2022.01)
*H04L 47/10* (2022.01)
*H04L 47/2483* (2022.01)

(52) U.S. Cl.
CPC .............. *H04L 47/22* (2013.01); *H04L 45/02* (2013.01); *H04L 47/125* (2013.01); *H04L 47/15* (2013.01); *H04L 47/2483* (2013.01)

(58) Field of Classification Search
CPC ....... H04L 47/125; H04L 47/15; H04L 47/22; H04L 47/2483; H04L 45/02; H04L 41/024; H04L 41/122; H04L 43/0876
See application file for complete search history.

(56) References Cited

U.S. PATENT DOCUMENTS

| 7,584,507 | B1 | 9/2009 | Nucci |
| 9,154,397 | B2 | 10/2015 | Reynolds et al. |
| 2014/0280894 | A1* | 9/2014 | Reynolds ............ H04L 43/0876 709/224 |
| 2018/0246746 | A1* | 8/2018 | Miller ....................... G06F 9/54 |

(Continued)

OTHER PUBLICATIONS

Sengar et al. "Online Detection of Network Traffic Anomalies Using Behavioral Distance," Thesis, Technology Development Department, NuVox Communications, Greenville, South Carolina, (2009).

(Continued)

*Primary Examiner* — Mohammad S Adhami
*Assistant Examiner* — Vladislav Y Agureyev
(74) *Attorney, Agent, or Firm* — Volpe Koenig

(57) ABSTRACT

Easy and correct estimation of a relationship between entities is made possible. An entity relationship estimation apparatus that estimates a relationship between a plurality of entities each executing a process is configured to include: a window-based correlation and traffic volume estimation unit that acquires traffic data of a plurality of entities, and calculates correlation values in one or more windows of a predetermined time width of each traffic data of at least one entity pair; and a relationship type estimation unit that estimates a type of relationship between entities of the entity pair based on the correlation values of the windows of the entity pair.

10 Claims, 11 Drawing Sheets

(56) References Cited

U.S. PATENT DOCUMENTS

| | | | |
|---|---|---|---|
| 2018/0248768 A1 | 8/2018 | Ibrahim et al. | |
| 2019/0095518 A1* | 3/2019 | Park et al. | |
| 2019/0250241 A1* | 8/2019 | Alawieh | G01S 5/04 |
| 2019/0250949 A1* | 8/2019 | Chen | H04L 43/062 |
| 2020/0336923 A1* | 10/2020 | Li | H04L 41/147 |
| 2021/0036921 A1* | 2/2021 | dos Santos Silva | H04L 41/0886 |
| 2021/0234754 A1* | 7/2021 | Golla | H04L 41/0816 |
| 2021/0250245 A1* | 8/2021 | Li | H04W 24/04 |
| 2021/0256479 A1* | 8/2021 | Roy | H04L 63/0428 |
| 2021/0392070 A1* | 12/2021 | Zad Tootaghaj | H04L 45/125 |
| 2022/0103433 A1* | 3/2022 | Akhilesham | H04L 41/147 |

OTHER PUBLICATIONS

European Search Report dated Feb. 18, 2022, for European Patent Application No. 21196173.5.
Communication Pursuant to Article 94(3) EPC dated Feb. 10, 2023, for the corresponding EP application, EP 21196173.5.

\* cited by examiner

Fig. 2

Entity traffic DB 200

Entity management table 201

| Entity ID (D20101) | Entity type (D20102) | Entity traffic data table ID (D20103) |
|---|---|---|
| 1 | Physical Server | Table 202-1 |
| 2 | VM | Table 202-2 |
| ... | ... | ... |
| N | Container | Table 202-n |

Entity traffic data table 202-1~n

| Data time point (D20201) | Outbound traffic (Tx) (D20202) | Inbound traffic (Rx) (D20203) |
|---|---|---|
| 2019-12-01 10:00:00 | 20000 | 25 |
| 2019-12-01 10:01:00 | 100 | 5500 |
| .... | .... | ... |

Fig. 4A

Entity pair management DB 130
Entity pair management table 131

| | D13101 | D13102 | D13103 | D13104 | D13105 | D13106 | D13107 | D13108 | D13109 |
|---|---|---|---|---|---|---|---|---|---|
| | Entity Pair ID | Entity 1 ID | Entity 2 ID | Window management table ID | (Tx, Tx)-pair window table ID | (Tx, Rx)-pair window table ID | (Rx, Tx)-pair window table ID | (Rx, Rx)-pair window table ID | Spike flag dictionary |
| | 1 | 1 | 2 | Table 132-1 | Table 133-1a | Table 133-1b | Table 133-1c | Table 133-1d | {'txtx':0,'txrx':0, 'rxtx':0,'rxrx':0} |
| | 2 | 2 | 3 | Table 132-2 | Table 133-2a | Table 133-2b | Table 133-2c | Table 133-2d | {'txtx':1,'txrx':1, 'rxtx':0,'rxrx':0} |
| | ... | ... | ... | ... | ... | ... | ... | ... | ... |
| | N | N-1 | N | Table 132-N | Table 133-Na | Table 133-Nb | Table 133-Nc | Table 133-Nd | {'txtx':0,'txrx':0, 'rxtx':0,'rxrx':0} |

Fig. 4B

Entity pair management DB 130

Entity pair window management table 132-1~N

D13201, D13202

| Window ID | Window data time point |
|---|---|
| 1 | {2019-12-01 10:00:00, 2019-12-01 10:00:01, ..., 2019-12-01 10:59:59} |
| 2 | {2019-12-01 11:00:00, 2019-12-01 11:00:01, ..., 2019-12-01 11:59:59} |
| .... | ... |
| N | {2019-12-24 23:00:00, 2019-12-24 23:00:01, ..., 2019-12-24 23:59:59} |

Entity pair window table 133-1a~Nd

D13301, D13302, D13303, D13304

| Window ID | Estimated correlation value | Estimated traffic volume | Weighted traffic volume |
|---|---|---|---|
| 1 | 0.83 | 700 | 560 |
| 2 | 0.74 | 5500 | 3850 |
| .... | .... | ... | ... |
| N | -0.1 | 10 | 0 |

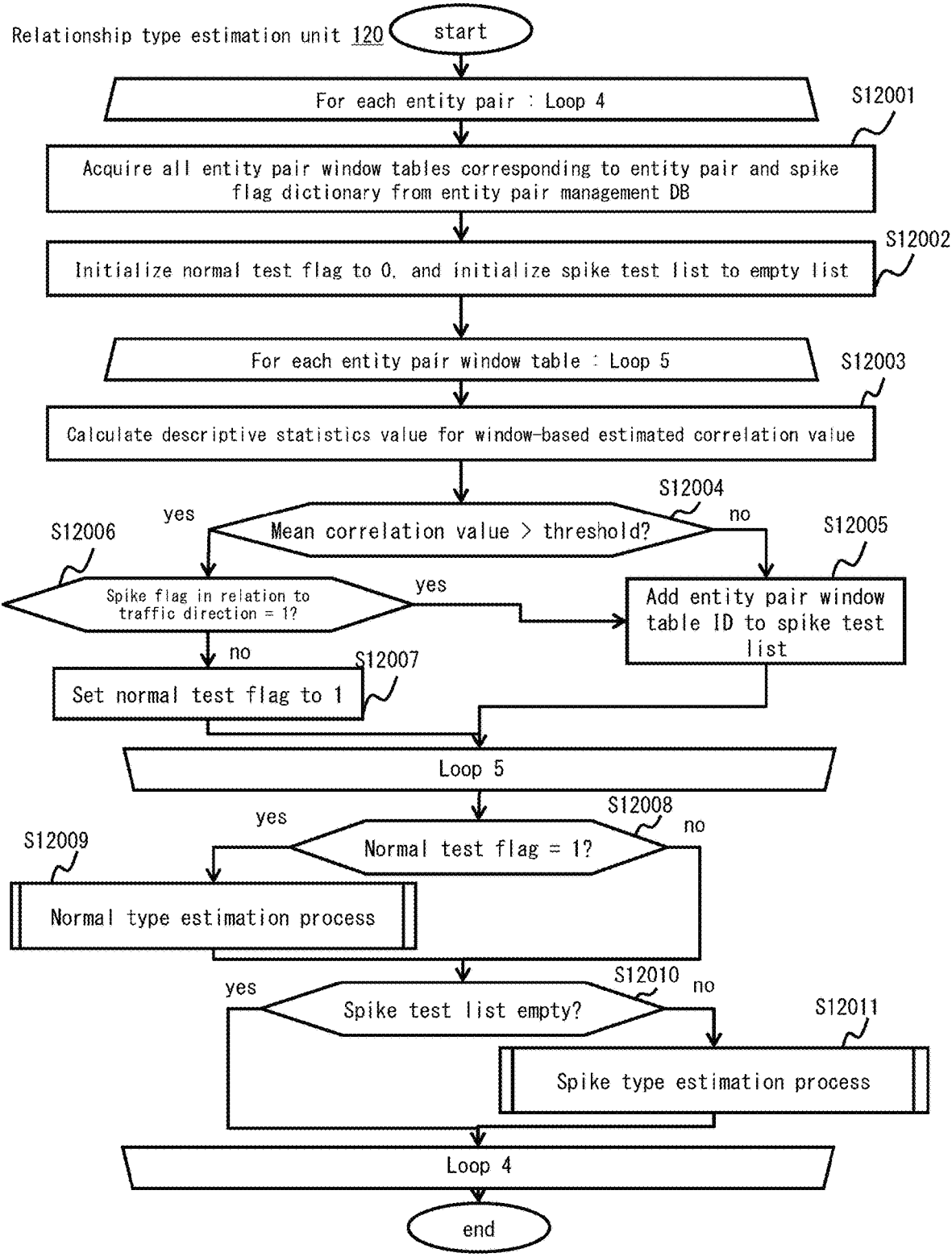

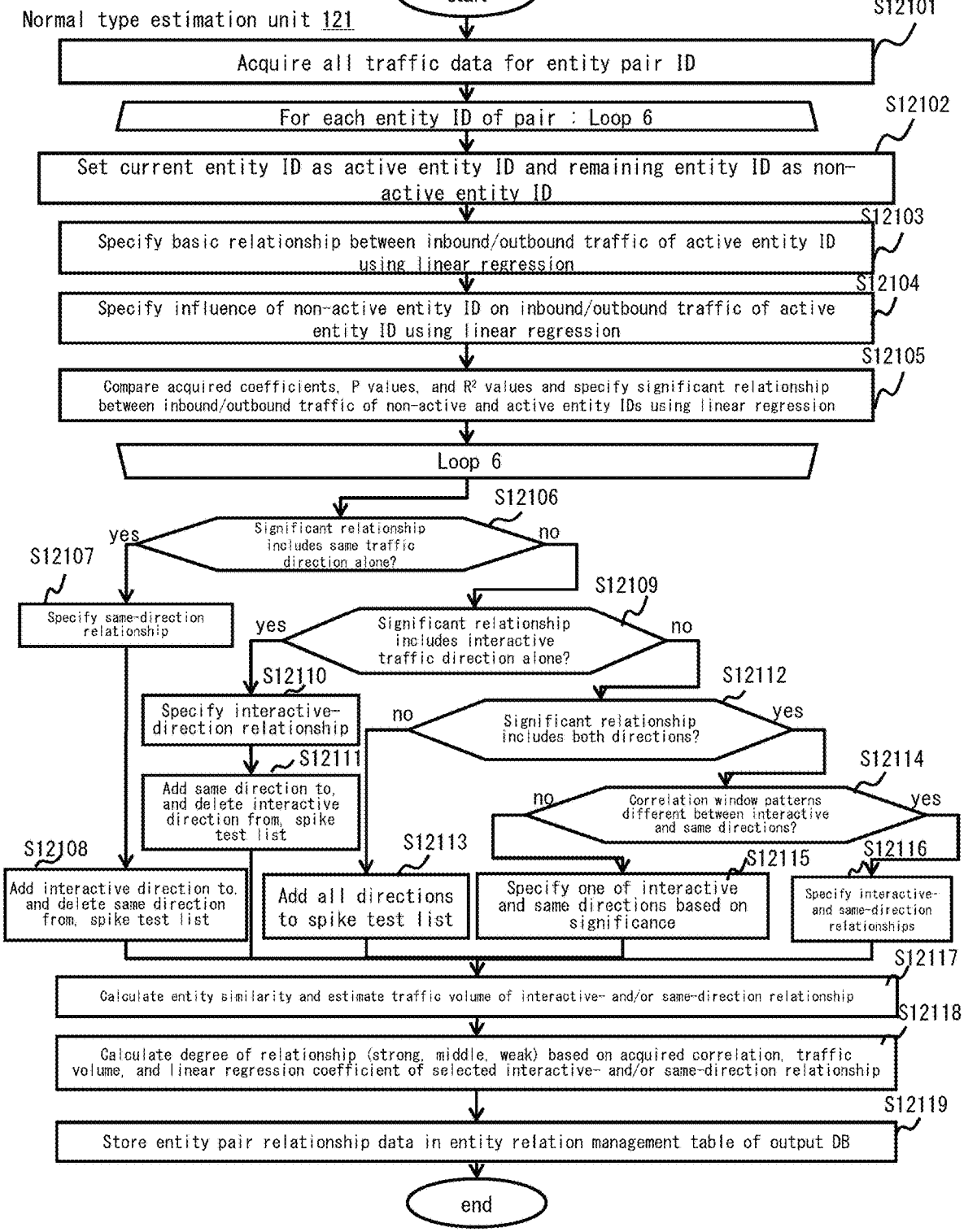

Fig. 8

Output DB 140
Entity (EN) relationship management table 141

| EN pair ID | EN 1 ID | EN 2 ID | Interactive direction relationship | | | | Same direction relationship | | | |
|---|---|---|---|---|---|---|---|---|---|---|
| | | | Degree of relationship | Traffic direction | Entity similarity | Estimated traffic volume | Degree of relationship | Traffic direction | Entity similarity | Estimated traffic volume |
| 1 | 1 | 2 | strong | inter | 85% | 50000 | none | none | none | none |
| 2 | 2 | 3 | spike | TxRx | 75% | 10000 | strong | RxRx | 90% | 100000 |
| ... | ... | ... | ... | ... | ... | ... | ... | ... | ... | ... |
| N | N-1 | N | none | none | none | none | weak | TxTx | 40% | 3000 |

Display 300

| Entity Pair ID 301 | Entity 1 ID 302 | Entity 2 ID 303 | Degree of relationship 304 | Estimated traffic volume 305 | Entity similarity 306 | Related traffic direction 307 |
|---|---|---|---|---|---|---|
| 1 | 1 | 2 | strong | 50000 | 85% | Inter |
| 2 | 10 | 132 | middle | 20000 | 67% | Same |
| ... | ... | ... | ... | ... | ... | ... |
| N | N | 4 | spike | 30000 | 50% | TxRx |

1000

ENTITY RELATIONSHIP ESTIMATION APPARATUS, ENTITY RELATIONSHIP ESTIMATION METHOD, AND RECORDING MEDIUM

CROSS-REFERENCE TO RELATED APPLICATIONS

This application claims priority from Japanese Patent Application No. 2020-169823 filed Oct. 7, 2020. The entire content of the priority application is incorporated herein by reference.

BACKGROUND

The present disclosure relates to a technique for estimating relationships between entities that each execute a process.

A large-scale IT environment such as a data center is composed of multiple entities, for example virtual machines (VMs), interacting with each other in a complex manner that is potentially frequently varying with its size and complexity continuously increasing. For an IT operator, a topology map that shows the interactive relationships between entities is essential for trouble-shooting and cost optimization of the large-scale IT environment. However, maintaining a topology map that indicates interactive relationships with a purely human workforce is difficult because of frequent changes and the large scale of the target environment.

A method as one solution for this is to use a special data collection agent that allows for observation of interactions between entities. This method requires to individually install a data collection agent for each of the entities. The method is unfeasible because it is not possible to install data collection agents for all the entities of an existing large-scale IT environment. Also, some clients oppose the installing of data collection agents, because the use of a special data collection agent is considered a security risk for classified information.

U.S. Patent Application Publication No. 2018/0248768, for example, proposes a method for specifying and quantifying the influence between entities. The technique according to U.S. Patent Application Publication No. 2018/0248768 quantifies the influence between performance data metrics and target performance metrics of some entities by using linear regression to calculate a linear regression coefficient for each input metric. Available topology information is used for predictive selection of an input entity for a specified target entity. Before the quantification step, a feature metric selection step is performed, which determines which of the topologically targeted metrics of input entity should be used for the linear regression for quantification of the influence of the target entity, using stepwise regression and granger causality and correlation.

SUMMARY

In a large-scale IT environment where only entity-related data can be obtained from a standard management interface, for example, topology information indicative of the relationships between entities in the environment is not readily available, it is difficult to maintain a topology map with human workforce alone.

The technique according to U.S. Patent Application Publication No. 2018/0248768 uses topology information to determine a group of entities potentially related to a target entity, and then quantifies the influence of each entity in the group on the target entity through a linear regression analysis. The technique of U.S. Patent Application Publication No. 2018/0248768 quantifies the degree of relationship between known related entities, but does not presuppose a case where two specific entities in a large-scale IT environment with thousands of entities are potentially related. Moreover, the entity relationship to be observed is limited to interactive relationships between entities. Therefore, it is not possible to find a relationship where two entities interact with another entity that exists in an IT environment outside the topology map.

The present disclosure was made in consideration of the circumstances described above, its object being to provide a technique that enables easy and correct estimation of a relationship between entities.

To achieve the above object, the entity relationship estimation apparatus according to one aspect is an entity relationship estimation apparatus configured to estimate a relationship between a plurality of entities each executing a process. The entity estimation apparatus includes a correlation estimation unit configured to acquire traffic data of a plurality of the entities, and to calculate correlation values in one or more windows of a predetermined time width of each traffic data of at least one entity pair or more, and a relationship type estimation unit configured to estimate a type of relationship between entities of the entity pair based on the correlation values of the windows of the entity pair.

The present disclosure enables easy and correct estimation of a relationship between entities.

BRIEF DESCRIPTION OF THE DRAWINGS

FIG. 2 is a configuration diagram of an entity traffic database according to one embodiment;

FIG. 4A is a configuration diagram of some table of an entity pair management database according to one embodiment;

FIG. 4B is a configuration diagram of remaining tables of the entity pair management database according to one embodiment;

FIG. 5 is a flowchart of a relationship type estimation process according to one embodiment;

FIG. 6 is a flowchart of a normal type estimation process according to one embodiment;

FIG. 8 is a configuration diagram of an output database according to one embodiment;

FIG. 10 is a diagram illustrating a screen example of a GUI according to one embodiment.

DETAILED DESCRIPTION OF THE EMBODIMENT

An embodiment will be described with reference to the drawings. Note, the embodiment described below shall not limit the present invention according to the claims, and all of various elements and combinations thereof described in the embodiment are not necessarily essential for the solutions provided by the invention.

While information is sometimes described with the expression "AAA table" in the following, information may be represented by any data structure. Namely, "AAA table" may be referred to as "AAA information" to indicate that the information does not depend on a data structure.

Entity in the following description refers to a logical or a physical entity that executes a process in an IT environment, a physical entity being, for example, a physical server, and a logical entity being a virtual machine (VM), container, program, and so on.

An entity pair refers to entities having two different unique entity IDs. An entity pair may be a pair of entities specified by a user, or a pair of combination of predetermined entities in an IT environment.

A traffic direction pair refers to a specific combination of two traffic directions of an entity pair. Each entity has two traffic directions, inbound (or "Rx") and outbound (or "Tx"). Therefore, there are four types of traffic direction pairs, inbound-inbound (Rx-Rx), outbound-inbound (Tx-Rx), inbound-outbound (Rx-Tx), and outbound-outbound (Tx-Tx).

Inbound-inbound (Rx-Rx) and outbound-outbound (Tx-Tx), which are pairs of the same directions for each entity of an entity pair, shall be referred to as same traffic direction (first traffic direction), and the outbound-inbound (Tx-Rx) and inbound-outbound (Rx-Tx), which are pairs of opposite directions for each entity, shall be referred to as interactive traffic direction (second traffic direction).

In this embodiment, entities of an entity pair are assumed to be associated with each other when any of the traffic direction pairs shows a similar traffic pattern. Associations between entities of an entity pair include a normal type (first type) relationship where the entity pair shows similar traffic patterns over a relatively long time (e.g., whole time), and a spike type (second type) relationship where the entity pair shows similar traffic patterns to a spike in a relatively short time.

Entity similarity is a metric indicating that a statistical linear approximation, for example, has been estimated for the traffic patterns of an entity pair. Degree of relationship is a metric that estimates the relationship strength of an entity pair taking into account not only the entity similarity, for example, but also other information acquired in the relationship estimation process.

Figure 1:
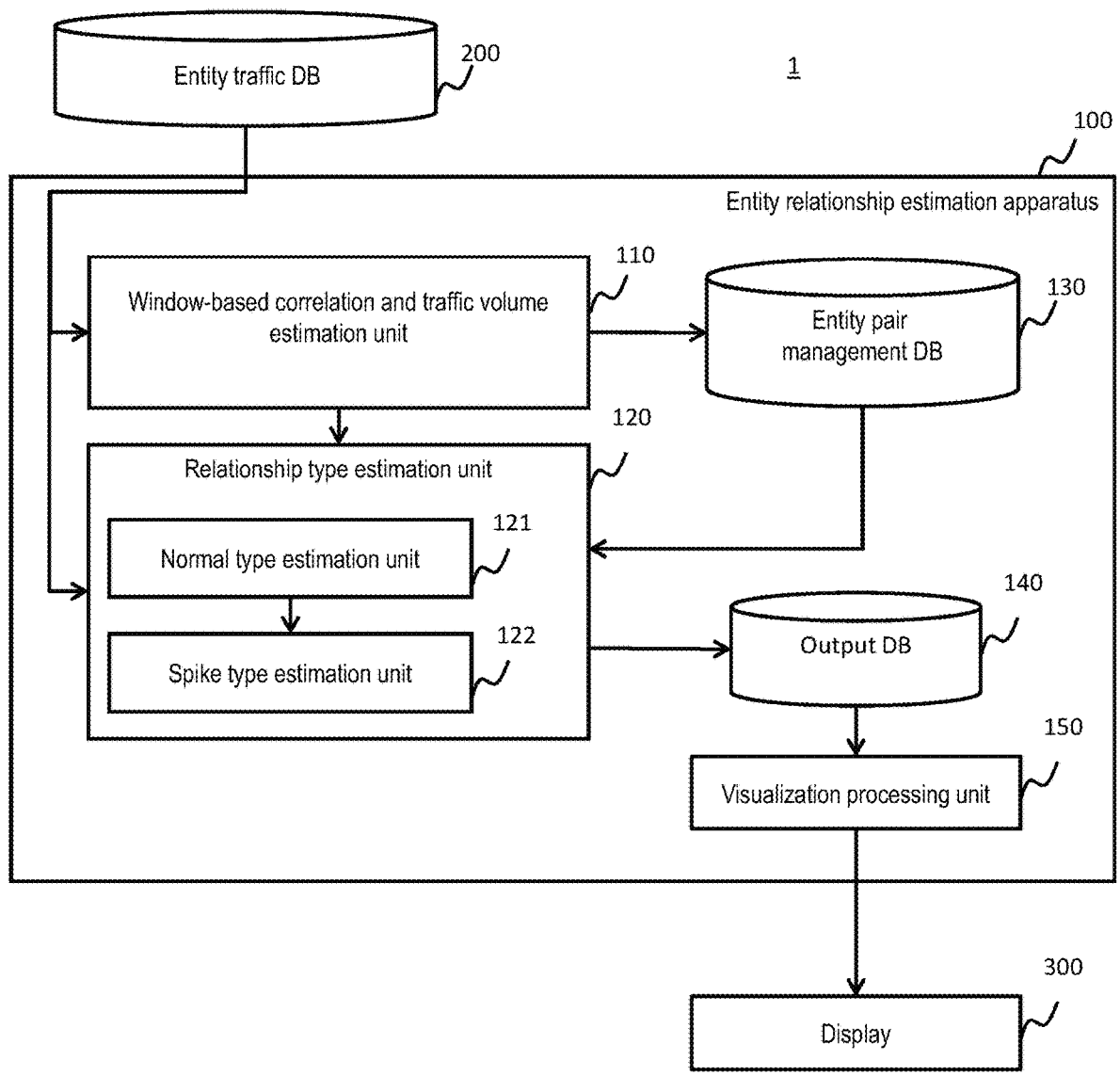
FIG. 1 is an overall configuration diagram of an entity relationship estimation system according to one embodiment.

FIG. 1 is an overall configuration diagram of an entity relationship estimation system according to one embodiment.

The entity relationship estimation system 1 includes an entity relationship estimation apparatus 100, an entity traffic database (DB) 200, and a display 300.

The entity traffic DB 200 stores datasets of traffic data (traffic datasets) about each entity analyzed by the entity relationship estimation apparatus 100. In this embodiment, the entity traffic DB 200 stores entity management tables 201 (see FIG. 2) that manage respective entities, and entity traffic data tables 202-1~n (see FIG. 2) that manage traffic data of each entity. In this embodiment, the entity traffic DB 200 assumed to be provided outside the entity relationship estimation apparatus 100, for example, assumed to be provided inside an apparatus coupled to the entity relationship estimation apparatus via a network (not shown). Alternatively, the entity traffic DB 200 may be provided inside the entity relationship estimation apparatus 100. The details of the entity traffic DB 200 will be described later with reference to FIG. 2.

The display 300 is an output device that allows for visualization of the results produced by the entity relationship estimation apparatus 100 with the use of a GUI (Graphical User Interface). In this embodiment, the display 300 shows the estimation results of a relationship between entities, for example, e.g., degree of relationship between entities and the like by means of the GUI. A display example of GUI in the display 300 will be described later with reference to FIG. 10.

The entity relationship estimation apparatus 100 includes a window-based correlation and traffic volume estimation unit 110 that is an example of a correlation estimation unit, a relationship type estimation unit 120, an entity pair management database (DB) 130, an output database (DB) 140, and a visualization processing unit 150.

An example of process in this embodiment will be described, in which the entity relationship estimation apparatus 100 has acquired (received) as a processing target, from the entity traffic DB 200, a traffic dataset of one or more entity pairs which is target for estimating its relationship.

The window-based correlation and traffic volume estimation unit 110 of the entity relationship estimation apparatus 100 processes the received traffic dataset. The window-based correlation and traffic volume estimation unit 110 estimates window-based correlation values, using the traffic data of each of the entities of each entity pair. Namely, the window-based correlation and traffic volume estimation unit 110 divides the traffic data of each of the entities of each entity pair into windows of a predetermined time width and calculates the correlation value of each window between the entities of the entity pair (window-based correlation value). The window-based correlation and traffic volume estimation unit 110 also estimates a traffic volume of window (estimated traffic volume). The window-based correlation and traffic volume estimation unit 110 stores the results obtained by the process in the entity pair management DB 130. The process by the window-based correlation and traffic volume estimation unit 110 will be described later with reference to FIG. 3, and the entity pair management DB 130 will be described later with reference to FIG. 4A and FIG. 4B.

The relationship type estimation unit 120 estimates whether or not the entities of each entity pair have a relationship, and what type (kind) of relationship they have and how strong the relationship is, using the window-based correlation values and estimated traffic volumes obtained by the window-based correlation and traffic volume estimation unit 110. The relationship type estimation unit 120 stores the results of estimated relationships between entities in the output DB 140. The relationship type estimation unit 120 includes a normal type estimation unit 121 and a spike type estimation unit 122. The process by the relationship type estimation unit 120 will be described later with reference to FIG. 5, FIG. 6, FIG. 7, and FIG. 8.

The visualization processing unit 150 extracts the results of relationship between the entities of entity pairs from the output DB 140, and visualizes the relationship results on the display 300. Relationship results visualized on the display 300 will be described later with reference to FIG. 10.

Next, the entity traffic DB 200 will be described.

FIG. 2 is a configuration diagram of an entity traffic database according to one embodiment.

The entity traffic DB 200 includes two kinds of tables, i.e., entity management table 201, and entity traffic data table 202 (202-1~n).

The entity management table 201 includes entries for each entity. The entry in the entity management table 201 includes columns of an entity ID D20101, an entity type D20102, and an entity traffic data table ID D20103.

The entity ID D20101 stores entity ID, which is unique value associated with an entity. The entity type D20102 stores category type of the entity corresponding to the entry. Category types include Physical Server indicating that the entity is a physical server, VM indicating that the entity is a virtual machine, Container indicating that the entity is a container, and so on. The entity traffic data table ID D20103 stores pointers to one of the entity traffic data tables 202-1~n that store inbound and outbound traffic information of entity corresponding to the entry.

The entity traffic data table 202 (202-1~n) stores traffic datasets each corresponding to each entity. The entity traffic data table 202 stores entries of each traffic data at each time point of corresponding entities. The entry in the entity traffic data table 202 includes columns of a data time point D20201, an outbound traffic (Tx) D20202, and an inbound traffic (Rx) D20203.

The data time point D20201 stores the date and time when the data included in the entry was acquired. The outbound traffic (Tx) D20202 stores the outbound traffic volume at the date and time corresponding to the entry. In this embodiment, the entity traffic data table 202 does not store information about an entity that is the destination of the data with the outbound traffic volume. The inbound traffic (Rx) D20203 stores the inbound traffic volume at the date and time corresponding to the entry. In this embodiment, the entity traffic data table 202 does not store information about an entity that is the source of the data with the inbound traffic volume. According to this embodiment, the information of the source or destination of the entity traffic need not be managed, and a relationship between entities can be estimated correctly using this traffic data by the process to be described later, without such information.

Next, a correlation value and a traffic volume estimation process executed by the window-based correlation and traffic volume estimation unit 110 will be described.

Figure 3:
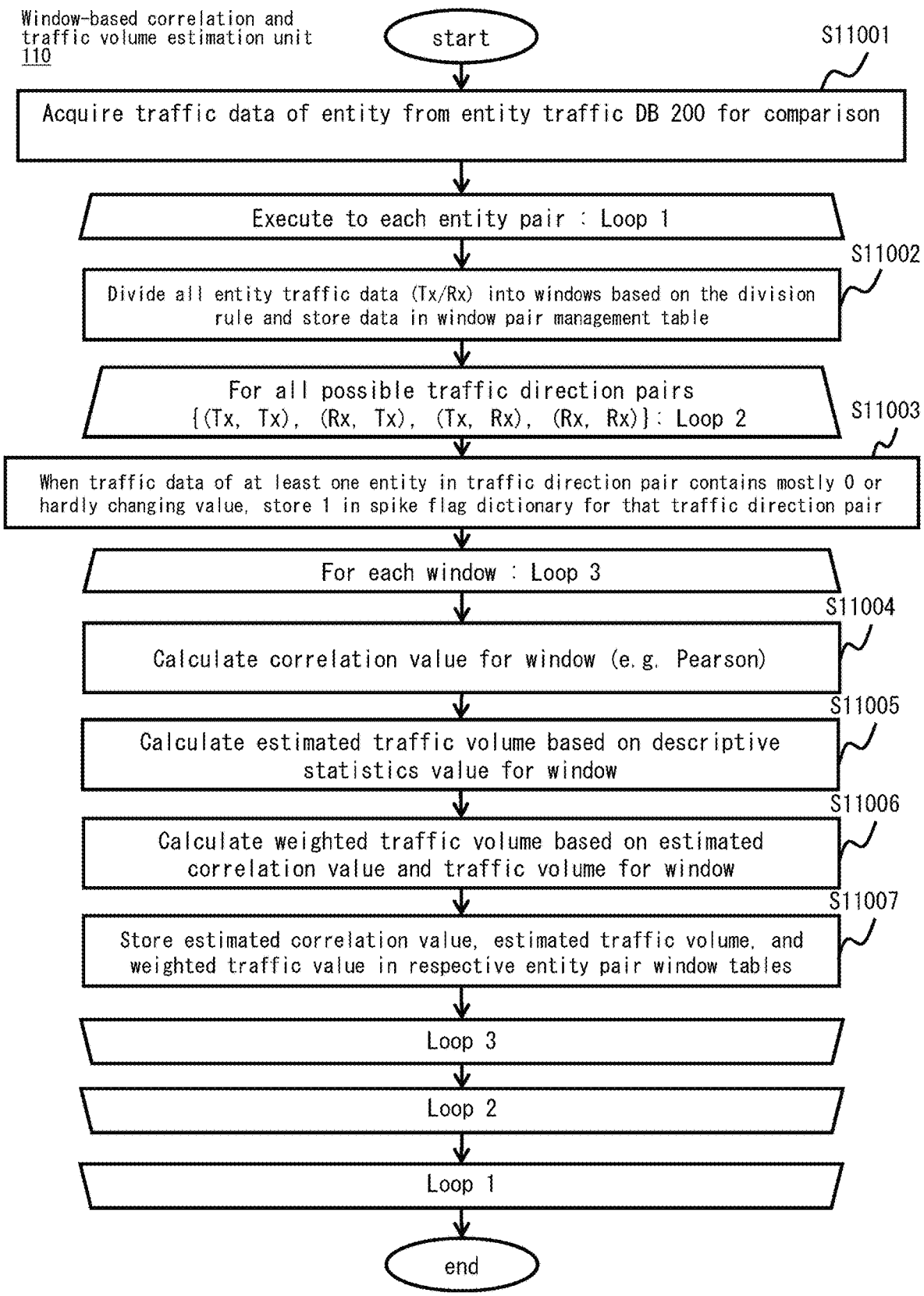
FIG. 3 is a flowchart of a correlation value and a traffic volume estimation process by a window-based correlation and traffic volume estimation unit according to one embodiment.

FIG. 3 is a flowchart of a correlation value and a traffic volume estimation process by the window-based correlation and traffic volume estimation unit according to one embodiment.

The window-based correlation and traffic volume estimation unit 110 acquires traffic data of each entity from the entity traffic DB 200 (S11001).

Next, the window-based correlation and traffic volume estimation unit 110 executes a loop 1 process (S11002 to S11007) for each entity pair. In the following description of this process, the entity pair which is a target of the process shall be referred to as "target entity pair".

In the loop 1 process, first, the window-based correlation and traffic volume estimation unit 110 divides the inbound and outbound traffic data of entities into windows in accordance with a predetermined dividing rule, such as rolling time window, for example, and stores the window data in the entity pair management DB 130 (S11002).

Next, the window-based correlation and traffic volume estimation unit 110 executes a loop 2 process (S11003 to S11007) to each of all the possible pairs of traffic directions (traffic direction pairs) for the target entity pair, i.e., inbound-inbound (Rx-Rx), inbound-outbound (Rx-Tx), outbound-inbound (Tx-Rx), and outbound-outbound (Tx-Tx). In the following description of this process, the traffic direction pair which is target of the process shall be referred to as "target traffic direction pair".

In the loop 2 process, when the traffic data of at least one entity of an entity pair in the target traffic direction pair contains a lot of 0s, or values that hardly change as time passes, the window-based correlation and traffic volume estimation unit 110 stores 1 to a spike flag dictionary of the entity pair management table 131 (see FIG. 4A) with respect to the target traffic direction pair, so that the traffic data of this target traffic direction pair will be excluded from the candidates (targets) for estimating a normal type relationship as will be described later (S11003). This process correctly prevents a case where the correlation value can turn out to be unexpectedly high when data does not change at all except for some data points from being erroneously estimated as a normal type relationship.

Next, the window-based correlation and traffic volume estimation unit 110 executes a loop 3 process (S11004 to S11007) to each of the windows of the target traffic direction pair of the target entity pair as targets. In the following description of this process, the window that is target of process shall be referred to as "target window".

In the loop 3 process, the window-based correlation and traffic volume estimation unit 110 calculates a correlation value for the target window using, for example, Pearson correlation (S11004).

Next, the window-based correlation and traffic volume estimation unit 110 estimates a traffic volume of the target window (estimated traffic volume) of the target traffic direction pair of the target entity, using descriptive statistics values (S11005). The maximum traffic volume between two compared entities of an entity pair is expected never to be larger than the smaller entity traffic volume at each time step. Therefore, for example, minimum values of traffic volume at respective time steps of the window are obtained, and aggregated to a base value of one window by calculating the mean or maximum of the minimum values, and this window base value is determined as the estimated traffic volume.

Next, the window-based correlation and traffic volume estimation unit 110 estimates a weighted traffic volume, using the correlation value estimated at step S11004 and the estimated traffic volume obtained at step S11005 (S11006). In this embodiment, the weighted traffic volume is estimated by multiplying the estimated traffic volume with a weight determined based on the correlation value of the window. For example, when the correlation value is larger than 0, the correlation value may be used as it is as the weight for the estimated traffic volume, and when the correlation value is smaller than 0, 0 may be used as the weight.

Next, the window-based correlation and traffic volume estimation unit 110 stores the estimated correlation value, estimated traffic volume, and weighted traffic volume in the corresponding entity pair window table 133 (one of 133-1a~Nd) of the entity pair management DB 130 (S11007).

After performing the loop 3 process to one target window, the window-based correlation and traffic volume estimation unit 110 takes an unprocessed window as the processing target and executes the loop 3 process, and exits the loop 3 when the loop 3 process has been performed to all the windows.

Next, after performing the loop 2 process to one target traffic direction pair, the window-based correlation and traffic volume estimation unit 110 takes an unprocessed traffic direction pair as the processing target and executes the loop 2 process, and exits the loop 2 when the loop 2 process has been performed to all the traffic direction pairs.

Next, after performing the loop 1 process to one target entity pair, the window-based correlation and traffic volume estimation unit 110 takes an unprocessed entity pair as the processing target and executes the loop 1 process, and exits the loop 1 when the loop 1 process has been performed to all the entity pairs and ends the correlation value and traffic volume estimation process.

According to this correlation and traffic volume estimation process, the correlation value, estimated traffic volume, and weighted traffic value for each window of each traffic direction pair of each entity pair are stored in the entity pair window table 133 (any of 133-1a~Nd).

Next, the entity pair management DB 130 will be described.

FIG. 4A is a configuration diagram of some table of an entity pair management database according to one embodiment. FIG. 4B is a configuration diagram of the remaining tables of the entity pair management database according to one embodiment.

The entity pair management DB 130 includes three kinds of tables, i.e., entity pair management table 131, entity pair window management table 132 (132-1~N), and entity pair window table 133 (133-1a~Nd).

The entity pair management table 131 includes entries for respective entity pairs. The entry of the entity pair management table 131 includes columns of an entity pair ID D13101, an entity 1 ID D13102, an entity 2 ID D13103, a window management table ID D13104, a (Tx, Tx)-pair window table ID D13105, a (Tx, Rx)-pair window table ID D13106, a (Rx, Tx)-pair window table ID D13107, a (Rx, Rx)-pair window table ID D13108, and a spike flag dictionary D13109.

The entity pair ID D13101 stores entity pair ID, which is unique value associated with the entity pair. The entity 1 ID D13102 stores entity ID of the first entity of entity pair corresponding to the entry. The entity 2 ID D13102 stores entity ID of the second entity of the entity pair corresponding to the entry.

The window management table ID D13104 stores pointer to the entity pair window management table 132 that stores window management information of the entity pair corresponding to the entry. The (Tx, Tx)-pair window table ID D13105 stores pointer to the entity pair window table 133 corresponding to the Tx-Tx pair of the entity pair corresponding to the entry. The (Tx, Rx)-pair window table ID D13106 stores pointer to the entity pair window table 133 corresponding to the Tx-Rx pair of the entity pair corresponding to the entry. The (Rx, Tx)-pair window table ID D13107 stores pointer to the entity pair window table 133 corresponding to the Rx-Tx pair of the entity pair corresponding to the entry. The (Rx, Rx)-pair window table ID D13108 stores pointer to the entity pair window table 133 corresponding to the Rx-Rx pair of the entity pair corresponding to the entry.

The spike flag dictionary D13109 stores spike flags indicative of whether or not each of the four traffic direction pairs of the entity pair corresponding to the entry should be excluded from the candidates of the process of estimating whether or not the entities have a normal type relationship therebetween. The spike flag is "1", for example, when a traffic direction pair is to be excluded from the estimation process, and "0" when a traffic direction is not to be excluded from the estimation process. The spike flags are used to make sure estimation of the normal type is not considered when the traffic data is very sparse and the calculated correlation value has a low reliability.

The entity pair window management tables 132 (132-1~N) include entries for each window with the traffic data of an entity pair divided with a predetermined time interval. Entry of the entity pair window management table 132 includes columns of a window ID D13201 and a window data time point D13202.

The window ID D13201 stores window ID, which is unique value associated with window corresponding to entry. The window data time point D13202 stores one or more time points of the data included in the window corresponding to entry.

The entity pair window tables 133 (133-1a~Nd) are provided correspondingly to each traffic direction pair of entity pairs. The entity pair window table 133 includes entries for each window. The entry in the entity pair window table 133 includes columns of a window ID D13301, an estimated correlation value D13302, an estimated traffic volume D13303, and a weighted traffic volume D13304.

The window ID D13301 stores window ID, which is unique value associated with window corresponding to the entry. The estimated correlation value D13302 stores correlation value estimated at step S11004 for the window corresponding to the entry. The estimated traffic volume D13303 stores estimated traffic volume estimated at step S11005 for the window corresponding to the entry. The weighted traffic volume D13304 stores weighted traffic volume calculated at step S11006 for the window corresponding to entry.

Next, the relationship type estimation process executed by the relationship type estimation unit 120 will be described.

FIG. 5 is a flowchart of the relationship type estimation process according to one embodiment The relationship type estimation unit 120 executes a loop 4 process (S12001 to S12011) to each entity pair. In the following description of this process, the entity which is the target of process shall be referred to as "target entity pair".

In the loop 4 process, the relationship type estimation unit 120 acquires the data of all the entity pair window tables 133 corresponding to a target entity pair, and the data of the spike flag dictionary D13109 from the entity pair management DB 130 (S12001).

Next, the relationship type estimation unit 120 initializes a normal test flag to 0, and initializes a spike test list to empty list (S12002).

Next, the relationship type estimation unit 120 executes a loop 5 process (S12003 to S12007) to each entity pair window table 133 acquired at step S12001. In the following description of this process, the entity pair window which is a target of process shall be referred to as "target entity pair window table".

In the loop 5 process, the relationship type estimation unit 120 calculates a descriptive statistics value of the window-based correlation value (S12003). In this embodiment, the relationship type estimation unit 120 calculates the mean of the window-based correlation values (mean correlation value), for example.

Next, the relationship type estimation unit 120 determines whether or not the mean correlation value exceeds a predetermined threshold (S12004). When the result shows the mean correlation value not exceeding the threshold (S12004: no), the relationship type estimation unit 120 adds the target entity pair window table ID to the spike test list (S12005).

On the other hand, when the mean correlation value is more than the threshold (S12004: yes), the relationship type estimation unit 120 determines whether or not the spike flag for the traffic direction pair corresponding to the target entity pair window table is 1 (S12006). When the result shows the spike flag being 1 (S12006: yes), it means that the correlation value has exceeded the threshold because the traffic data contains a lot of 0s or values that hardly change as time passes, for example. Therefore, the relationship type estimation unit 120 proceeds the process to step S12005 and adds the target entity pair window table to the spike test list, so as to exclude it from the target of estimation of a normal type relationship.

On the other hand, when the spike flag is not 1, the relationship type estimation unit 120 sets the normal test flag to 1 to make the traffic direction pair as the target of estimation of a normal type relationship (S12007).

After performing the loop 5 process to one target entity pair window table, the relationship type estimation unit 120 takes an unprocessed entity pair window table as the processing target and executes the loop 5 process, and exits the loop 5 when the loop 5 process has been performed to all the entity pair window tables and proceeds the process to step S12008.

At step S12008, the relationship type estimation unit 120 determines whether or not the normal test flag is 1. When the result shows the normal test flag being 1 (S12008: yes), the relationship type estimation unit 120 executes the normal type estimation process (see FIG. 6) (S12009), and proceeds the process to step S12010. On the other hand, when the result shows the normal test flag not being 1 (S12008: no), the relationship type estimation unit 120 proceeds the process to step S12010.

At step S12010, the relationship type estimation unit 120 determines whether or not the spike test list is empty. When the result shows the spike test list being empty (S12010: yes), it means that there is no need to execute the spike type estimation process, and therefore the relationship type estimation unit 120 ends the process for the target entity pair. On the other hand, when the result shows the spike test list not being empty (S12010: no), the relationship type estimation unit 120 executes the spike type estimation process (see FIG. 7) (S12011), and ends the process for the target entity pair.

After performing the loop 4 process to one target entity pair, the relationship type estimation unit 120 takes an unprocessed entity pair as the processing target and executes the loop 4 process, and exits the loop 4 when the loop 4 process has been performed to all the entity pairs and ends the relationship type estimation process.

Next, the normal type estimation process (step S12009 in FIG. 5) executed by the normal type estimation unit 121 will be described.

FIG. 6 is a flowchart of the normal type estimation process according to one embodiment.

The normal type estimation unit 121 acquires all the traffic data corresponding to the target entity pair from the entity traffic DB 200 (S12101). Next, the normal type estimation unit 121 executes a loop 6 process (S12102 to S12105) to each entity of the entity pair.

In the loop 6 process, the normal type estimation unit 121 sets the entity ID of the entity which is a current processing target as active entity ID, and sets the entity ID of the remaining entity of the entity pair as non-active entity ID (S12102).

Next, the normal type estimation unit 121 estimates a basic relationship between the inbound and outbound traffic of the entity with the active entity ID using linear regression whereby a coefficient, P value, $R^2$ value (determinant coefficient) are obtained (S12103). For example, the linear regression is used to train a model for inbound traffic expected from the outbound traffic. Namely, the linear regression model is trained by using the inbound traffic as output data and the outbound traffic as input data.

Next, the normal type estimation unit 121 estimates an influence of the entity with the non-active entity ID on the inbound and outbound traffic of the entity with the active entity ID using linear regression whereby a coefficient, P value, $R^2$ value are obtained (S12104). For example, some linear regression models are trained, with inbound or outbound traffic of the entity with the active entity ID being set as output, and the remaining traffic direction, i.e., outbound or inbound traffic, of the entity with the active entity ID and one traffic direction of the entity with the non-active entity ID being set as input. Thus, four trained linear regression models and their coefficients, P values, and $R^2$ values are obtained.

Next, the normal type estimation unit 121 specifies a significant relationship between the inbound and outbound traffic of the entities with the non-active and active entity IDs by comparing the coefficients, P values, and $R^2$ values obtained at steps S12103 and S12104 (S12105). For example, the P value of the inbound traffic direction of the entity with the non-active entity ID indicates whether or not the traffic information of the entity with the non-active entity ID has been able to be added to the linear regression of the traffic of the entity with the active entity ID, which is used with a statistical value as output. When the P value is smaller than a threshold and $R^2$ value obtained at S12104 value has improved as compared to the $R^2$ value at step S12103, it is considered that the traffic relationship is significant between the traffic direction of the entity with the non-active entity ID used as input of the linear regression model and the traffic direction of the entity with the active entity ID used as output of the linear regression model.

The normal type estimation unit 121 performs the loop 6 process to an unprocessed entity ID as the processing target, exits the loop 6 when the loop 6 process has been performed to all the entity IDs of the entity pair ID, and proceeds the process to step S12106.

At step S12106, the normal type estimation unit 121 determines whether or not the significant relationship includes only the same traffic directions, i.e., only the inbound-inbound or outbound-outbound traffic direction pairs.

When the result shows the significant relationship including only the same traffic directions (S12106: yes), the normal type estimation unit 121 proceeds the process to step S12107, and when the significant relationship does not include only the same traffic directions (S12106: no), the normal type estimation unit 121 proceeds the process to step S12109.

At step S12107, the normal type estimation unit 121 specifies the normal relationship type as one of the three options of same-direction relationship, i.e., significant in both inbound-inbound and outbound-outbound, significant in Tx-Tx (outbound-outbound), and significant in Rx-Rx (inbound-inbound). Here, the same-direction relationship indicates, for example, a relationship where the two entities of an entity pair have similar traffic to another same entity.

Next, the normal type estimation unit 121 adds the traffic direction pairs in which there is no significant relationship, i.e., inbound-outbound and outbound-inbound interactive traffic direction pairs, to the spike test list, and deletes the same traffic direction pairs from the spike test list (S12108).

At step S12109, the normal type estimation unit 121 determines whether or not the significant relationship includes only the interactive traffic directions, i.e., only the inbound-outbound and/or outbound-inbound traffic directions. When the result shows the significant relationship including only the interactive traffic directions (S12109: yes), the normal type estimation unit 121 proceeds the process to step S12110, and when the significant relationship does not include only the interactive traffic directions (S12109: no), the normal type estimation unit 121 proceeds the process to step S12112.

At step S12110, the normal type estimation unit 121 specifies the normal relationship type as one of the three options of interactive-direction relationship, i.e., significant in both inbound-outbound and outbound-inbound, significant in Tx-Rx (outbound-inbound), and significant in Rx-Tx (inbound-outbound). Here, the interactive-direction relationship indicates, for example, a relationship where there is traffic from one to the other of two entities of an entity pair.

Next, the normal type estimation unit 121 adds the traffic direction pairs in which there is no significant relationship, i.e., inbound-inbound and outbound-outbound same traffic direction pairs, to the spike test list, and deletes the interactive traffic direction pairs from the spike test list (S12111).

At step S12112, the normal type estimation unit 121 determines whether or not the significant relationship includes both traffic directions, i.e., interactive and same traffic directions. When the result shows the significant relationship including both traffic directions (S12112: yes), the normal type estimation unit 121 proceeds the process to step S12114, and when the significant relationship does not include both traffic directions (S12112: no), the normal type estimation unit 121 proceeds the process to step S12113.

At step S12113, the normal type estimation unit 121 adds the traffic direction pairs in which there is no significant relationship, i.e., same and interactive traffic directions, to the spike test list.

At step S12114, the normal type estimation unit 121 determines whether or not the interactive and same traffic directions have different correlation window patterns. When the result shows the correlation window patterns being different (S12114: yes), the normal type estimation unit 121 proceeds the process to step S12116, and when the correlation window patterns are not different (S12114: no), the normal type estimation unit 121 proceeds the process to step S12115.

At step S12115, since both the interactive and same traffic directions show similar correlation window patterns, the normal type estimation unit 121 determines which of the interactive direction pair and same direction pair of this entity pair shows dominance. The linear regression results acquired at steps S12103 and S12104, for example, may be used for the evaluation. This can be observed when, in all the significant relationships between the input traffic direction of the non-active entity (non-active traffic direction) and the output traffic direction of the active entity (active traffic direction), the input non-active traffic direction has more influence on the inbound or outbound traffic direction of the active ID. After a maximum of four most significant traffic direction pairs have been acquired, these traffic direction pairs can be ranked in accordance with which of the non-active traffic direction can improve which active traffic direction most. The top ranked pair can be used to determine the same- or interactive-direction normal relationship type. When the results are highly analogous in both directions, the interactive direction may be selected as the normal direction type.

At step S12116, the normal type estimation unit 121 specifies the normal relationship type as both interactive and same direction, since it is highly likely that there are two relationships between the entity pair having different correlation window patterns.

At step S12117, the normal type estimation unit 121 calculates an entity similarity and estimated mean traffic volume for the normal type relationship in the selected interactive and/or same direction. The entity similarity is calculated as percentage from the mean of correlation values stored in the entity pair management DB 130. When the normal type relationship includes both interactive and same directions, the final entity correlation value is calculated by first calculating means for each window of the window-based correlation data of all the traffic directions, after which the mean is calculated for all the windows. Similar approach is taken for the estimated mean traffic volume, where the weighted traffic volume, for example, retrieved from the entity pair management DB 130 can be used.

At step S12118, if any of the normal type relationships has been specified, i.e., if all the directions have not been added to the spike test list, the normal type estimation unit 121 calculates the degree of relationship of the normal type relationship. For example, the normal type estimation unit 121 calculates the degree of relationship of the interactive- or same-direction relationship type from the entity similarity, traffic volume, and linear regression results obtained at previous steps. Here, the ranks of improvement in $R^2$ values of linear regression models for the included traffic direction pairs, entity similarity, and estimated traffic volume are used for determining the degree of relationship, i.e., strong, middle, or weak, in a rule-based method. For example, when the estimated traffic volume and entity similarity are relatively high, and the observed rank of improvement of the linear regression model is high, the relationship is specified as strong.

At step S12119, the normal type estimation unit 121 stores the results acquired at steps S12117 and S12118 in the entity relationship management table 141 of the output DB 140.

Next, the spike type estimation process (step S12011 in FIG. 5) executed by the spike type estimation unit 122 will be described.

Figure 7:
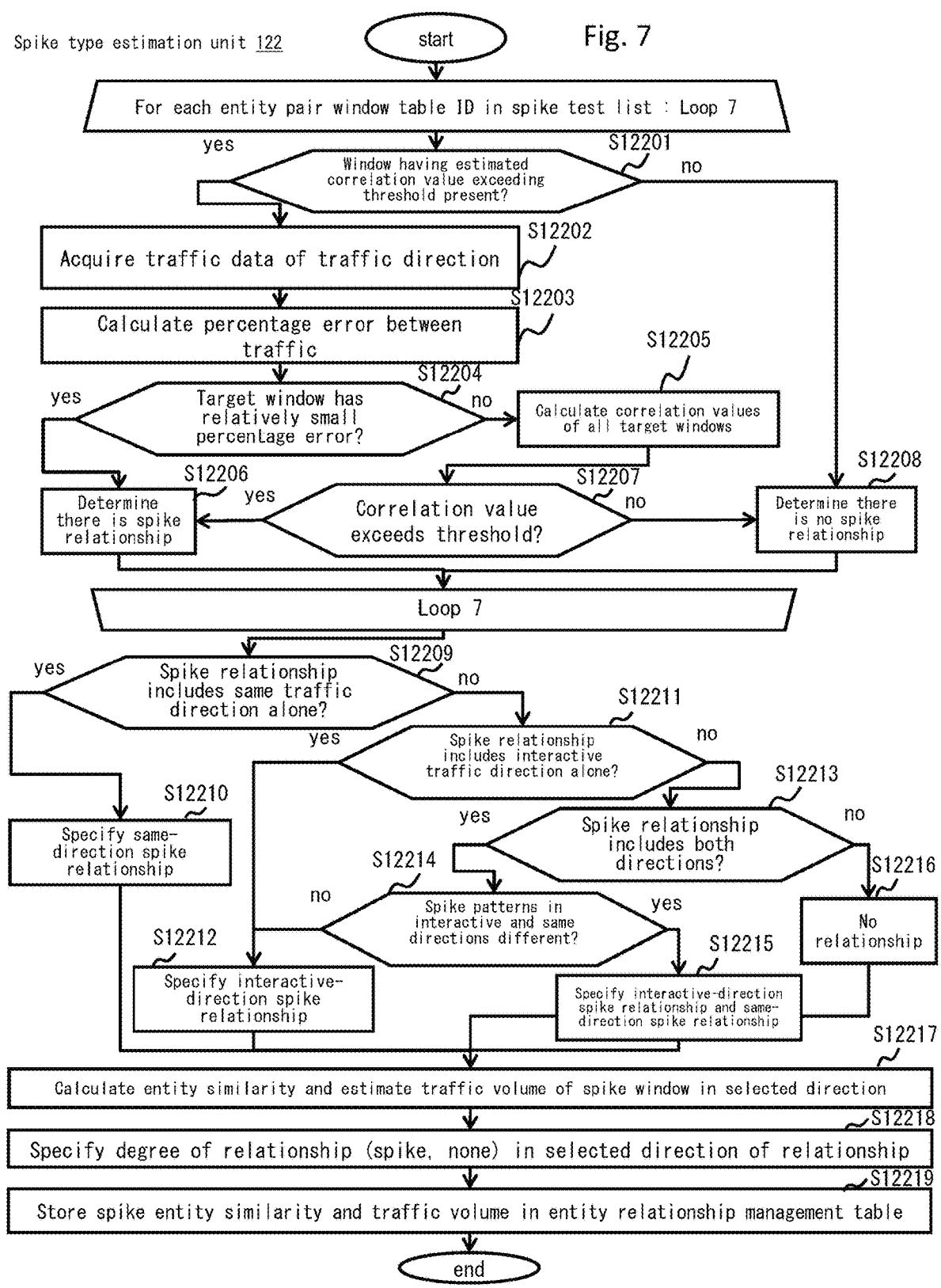
FIG. 7 is a flowchart of a spike type estimation process according to one embodiment.

FIG. 7 is a flowchart of the spike type estimation process according to one embodiment.

The spike type estimation unit 122 executes a loop 7 process (S12201 to S12208) to each entity pair window table ID in the spike test list.

In the loop 7 process, the spike type estimation unit 122 looks up the entity pair window table 133 corresponding to the entity pair window table ID that is the processing target (hereinafter referred to as target window table), and determines whether or not there is a window having an estimated correlation value exceeding a predetermined threshold (S12201). When the result shows the presence of a window having a correlation value exceeding a predetermined threshold (S12201: yes), the spike type estimation unit 122 proceeds the process to step S12202, and when there is no window having a correlation value exceeding the predetermined threshold (S12201: no), the spike type estimation unit 122 proceeds the process to step S12208.

At step S12202, the spike type estimation unit 122 acquires the traffic data of the traffic direction corresponding to the target window table 133 from the entity traffic DB 200.

Next, the spike type estimation unit 122 calculates a percentage error between traffic direction data of the entity pair corresponding to the target window table (S12203).

Next, the spike type estimation unit 122 determines whether or not a target window, i.e., the window determined at step S12201 to have a correlation value exceeding the threshold, has a relatively small percentage error (S12204). When the result shows the window having a relatively small percentage error (S12204: yes), the spike type estimation unit 122 proceeds the process to step S12206, and when the window does not have a relatively small percentage error (S12204: no), the spike type estimation unit 122 proceeds the process to step S12205.

At step S12205, the spike type estimation unit 122 calculates the correlation values of all the time steps in the target window, and proceeds the process to step S12207.

At step S12206, the spike type estimation unit 122 determines that the entity pair including the window that has been checked at step S12204, or step S12207 to be described later, has a spike type relationship (spike relationship) in terms of the target traffic direction pair.

At step S12207, the spike type estimation unit 122 determines whether or not the correlation values of the window calculated at step S12205 exceed a predetermined threshold. When the result shows the correlation values exceeding the threshold (S12207: yes), the spike type estimation unit 122 proceeds the process to step S12206, and when the correlation values do not exceed the threshold (S12207: no), the spike type estimation unit 122 proceeds the process to step S12208.

At step S12208, the spike type estimation unit 122 determines that the target entity pair does not have a spike relationship in terms of the target traffic direction pair.

After ending the step S12206 or S12208, the spike type estimation unit 122 takes an unprocessed entity pair window table ID as the processing target and executes the loop 7 process, and exits the loop 7 when the loop 7 process has been performed to all the entity pair window table IDs in the spike test list and proceeds the process to step S12209.

At step S12209, the spike type estimation unit 122 determines whether or not the determined spike relationship includes only the same traffic directions, i.e., only the inbound-inbound and/or outbound-outbound traffic direction pairs. When the result shows only the same traffic directions (S12109: yes), the spike type estimation unit 122 proceeds the process to step S12110, and when the result shows not only the same traffic directions (S12109: no), the spike type estimation unit 122 proceeds the process to step S12111.

At step S12210, the spike type estimation unit 122 specifies the spike relationship type as one of the three options of same-direction spike relationship, i.e., both of the same directions (inbound-inbound and outbound-outbound), Tx-Tx (outbound-outbound), and Rx-Rx (inbound-inbound), and proceeds the process to step S12217.

At step S12211, the spike type estimation unit 122 determines whether or not only the interactive traffic directions, i.e., only the inbound-outbound and/or outbound-inbound traffic directions are included. When the result shows only the interactive traffic directions being included (S12211: yes), the spike type estimation unit 122 proceeds the process to step S12212, and when the result shows not only the interactive traffic directions being included (S12211: no), the spike type estimation unit 122 proceeds the process to step S12213.

At step S12212, the spike type estimation unit 122 specifies the spike relationship type as one of the three options of interactive-direction spike relationship, i.e., both of the interactive directions (inbound-outbound and outbound-inbound), Tx-Rx (outbound-inbound), and Rx-Tx (inbound-outbound), and proceeds the process to step S12217.

At step S12213, the spike type estimation unit 122 determines whether or not both traffic directions, i.e., interactive and same traffic directions, are included. When the result shows both traffic directions being included (S12213: yes), the spike type estimation unit 122 proceeds the process to step S12214, and when the result shows not both traffic directions being included (S12213: no), the spike type estimation unit 122 proceeds the process to step S12216.

At step S12214, the spike type estimation unit 122 determines whether or not the spike patterns are different between the interactive and same traffic directions. When the result shows the spike patterns being different (S12214: yes), the spike type estimation unit 122 proceeds the process to step S12215, and when the spike patterns are not different (S12214: no), the spike type estimation unit 122 proceeds the process to step S12212.

At step S12215, the spike type estimation unit 122 specifies the spike relationship type as both interactive and same direction, since it is highly likely that there are two relationships between the entity pairs having different spike patterns, and proceeds the process to step S12217.

At step S12216, the spike type estimation unit 122 determines that there is no relationship between the entity pair, and proceeds the process to step S12217.

At S12217, the spike type estimation unit 122 estimates an entity similarity and traffic volume of the target window of the target traffic direction. Next, the spike type estimation unit 122 specifies a degree of relationship for the target traffic direction (S12218). Here, the degree of relationship is expressed as spike when there is a spike relationship, and none when there is no spike relationship.

Next, the spike type estimation unit 122 stores the estimated or specified degree of relationship, entity similarity, and traffic volume in the entity relationship management table 141 of the output DB 140 (S12219), and ends the process.

Next, the output DB 140 will be described.

FIG. 8 is a configuration diagram of the output database according to one embodiment.

The output DB 140 includes an entity (EN) relationship management table 141.

The entity relationship management table 141 includes entries for respective entity pairs. The entry in the entity relationship management table 141 includes columns of an entity pair ID D14101, an entity 1 ID D14102, an entity 2 ID D14103, a degree of relationship D14104, a traffic direction D14105, an entity similarity D14106, an estimated traffic volume D14107, a degree of relationship D14108, a traffic direction D14109, an entity similarity D14110, and an estimated traffic volume D14111. The degree of relationship D14104, the traffic direction D14105, the entity similarity D14106, and the estimated traffic volume D14107 are columns for relationships in interactive directions, and the degree of relationship D14108, the traffic direction D14109, the entity similarity D14110, and the estimated traffic volume D14111 are columns for relationships in the same direction.

The entity pair ID D14101 stores an entity pair ID, which is unique value associated with the entity pair. The entity 1 ID D14102 stores an entity ID of the first entity of entity pair corresponding to the entry. The entity 2 ID D14103 stores an entity ID of the second entity of the entity pair corresponding to the entry.

The degree of relationship D14104 stores the degree of relationship between entity pair with respect to interactive-direction relationships. The degree of relationship is set as one of strong, middle, and weak in accordance with the strength of the relationship when there is the normal type relationship, and as spike when there is the spike type relationship. When there is no relationship, none is set.

The traffic direction D14105 stores traffic directions in which an interactive-direction relationship is observed. Specifically, when there is an interactive-direction relationship, one of inter (indicating both directions), TxRx, and RxTx is stored. None is set in the traffic direction D14105 when there is no interactive-direction relationship. The entity similarity D14106 stores similarity between entities of entity pair corresponding to the entry. Similarity indicates the strength of the correlation value observed when all the window-based correlation values are aggregated in consideration of the relationship type, i.e., whether normal type or spike type, and is stored as percentage, for example. When there is no relationship between the entities of the entity pair, none is set in the entity similarity D14106.

The estimated traffic volume D14107 stores potential traffic volume (estimated traffic volume) estimated to be observed between entities of entity pair. The estimated traffic volume is the aggregate value of traffic volumes obtained from all the estimated window-based traffic in consideration of the relationship type, i.e., normal type or spike type.

The degree of relationship D14108 stores the degree of relationship between entity pair with respect to the same-direction relationships. The degree of relationship is set as one of strong, middle, and weak in accordance with the strength of the relationship when there is the normal type relationship, and as spike when there is the spike type relationship. When there is no relationship, none is set.

The traffic direction D14109 stores traffic directions in which a same-direction relationship is observed. Specifically, when there is a same-direction relationship, one of same (both same directions), TxTx, and RxRx is stored. None is set in the traffic direction D14109 when there is no same-direction relationship. The entity similarity D14110 stores similarity between entities of entity pair corresponding to the entry. Similarity indicates the strength of the correlation value observed when all the window-based correlation values are aggregated in consideration of the relationship type, i.e., whether normal type or spike type, and is stored as percentage, for example. When there is no relationship between the entities of the entity pair, none is set in the entity similarity D14110.

The estimated traffic volume D14111 stores potential traffic volume (estimated traffic volume) estimated to be observed between entities of entity pair. The estimated traffic volume is the aggregate value of traffic volumes obtained from all the estimated window-based traffic in consideration of the relationship type, i.e., normal type or spike type. When there is no relationship between the entities of the entity pair, none is set in the estimated entity similarity D14110.

Next, the hardware configuration of the entity relationship estimation apparatus 100 will be described.

Figure 9:
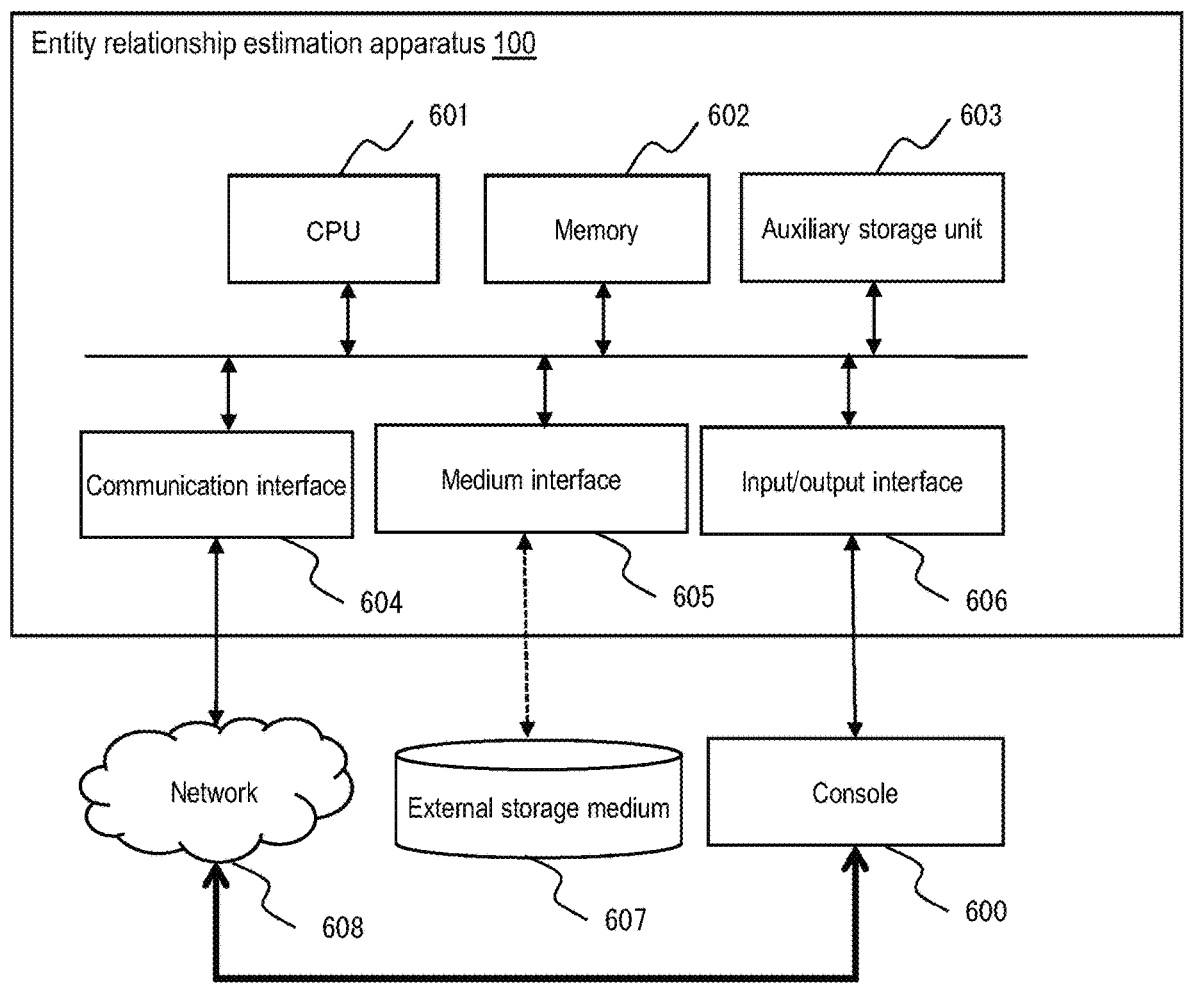
FIG. 9 is a hardware configuration diagram of an entity relationship estimation apparatus according to one embodiment.

FIG. 9 is a hardware configuration diagram of the entity relationship estimation apparatus according to one embodiment.

The entity relationship estimation apparatus 100 is a general-purpose computer, for example, and includes a CPU (Central Processing Unit) 601, a memory 602, an auxiliary storage unit 603, a communication interface 604, a medium interface 605, and an input/output interface 606.

The CPU 601 executes a program stored in the memory 602 or auxiliary storage unit 603, and executes various processes by using data stored in the memory 602 or auxiliary storage unit 603. The memory 602 is a RAM (Random Access Memory), for example, and stores programs executed by the CPU 601, data, and the like. The auxiliary storage unit 603 is a hard disk drive, flash memory, RAM and the like, for example, and stores programs executed by the CPU 601, and data used by the CPU 601.

The communication interface 604 is an interface for communication with other apparatuses (such as a console 600) via a network 608. The medium interface 605 allows an external storage medium 607 to be removably attached thereto and intermediates the input and output of data to and from the external storage medium 607, for example a recording medium. The input/output interface 606 can be coupled to the console 600 or display 300 that are operated by the administrator or a user of the entity relationship estimation apparatus 100, and executes input and output of information to and from the console 600, and executes display on the display 300.

Various functional units of the entity relationship estimation apparatus 100 in FIG. 1 are implemented, for example, by the CPU 601 executing a program (entity relationship estimation program) stored in the memory 602 or auxiliary storage apparatus 603. Information managed in the functional units (entity pair management DB 130 and output DB 140) is stored in the memory 602 or auxiliary storage unit 603 that are examples of storage unit.

The program the CPU 601 executes may be acquired from another apparatus via the communication interface 604 as required, or read and acquired from a storage medium available via the medium interface 605. The storage medium is a communication medium removably attached to the medium interface 605 (i.e., carriers or digital signals propagating through wired or wireless connections, optical networks, or networks), or the external storage medium 607.

Next, a GUI screen example will be described.

FIG. 10 is a diagram illustrating a screen example of the GUI according to one embodiment.

The screen 1000 shown on the display 300 includes an entity relationship result table. The entity relationship result table includes entries for respective entity pairs. The entry in the entity relationship result table includes columns of entity pair ID 301, entity 1 ID 302, entity 2 ID 303, degree of relationship 304, estimated traffic volume 305, entity similarity 306, and related traffic direction 307. The displayed contents of the screen 1000 are updated as required in accordance with the information transmitted from the visualization processing unit 150.

The entity pair ID 301 shows entity pair ID, which is unique value associated with respective entity pair. The entity 1 ID 302 shows entity ID of the first entity of entity pair corresponding to the entry. The entity 2 ID 303 shows entity ID of the second entity of the entity pair corresponding to the entry.

The degree of relationship 304 shows the degree of relationship between entities of respective entity pair. The degree of relationship includes strong, middle, and weak set in accordance with the strength of the relationship when there is the normal type relationship, and spike set when there is the spike type relationship. When there is no relationship, none is displayed.

The estimated traffic volume 305 shows potential traffic volume (estimated traffic volume) estimated to be observed between entities of the entity pair. When there is no relationship between entities of the entity pair, none is displayed in the estimated traffic volume 305.

The entity similarity 306 shows similarity between entities of entity pair corresponding to the entry. When there is no relationship between the entities of the entity pair, none is displayed in the entity similarity 306.

The related traffic direction 307 stores traffic directions in which a relationship is observed. Specifically, one of inter (indicating both directions), same (indicating both same directions), TxRx, RxTx, TxTx, and RxRx is displayed.

When there is no relationship between entities of an entity pair, none is displayed in the related traffic direction 307.

This screen 1000 allows for easy and correct understanding of what kind of relationship there is, strength of relationship, estimated traffic volume, entity similarity, traffic directions related between entities, etc., between entities of each entity pair.

It should be understood that the present invention is not limited to the embodiment described above, and various modifications can be made as required in implementing the present invention without departing from the subject matter thereof.

For example, some or all of the processes the CPU performs in the above embodiment may be carried out by a hardware circuit. The program in the above embodiment can be installed from a program source. The program source may be a program distribution server, or storage medium (e.g., portable recording medium).

What is claimed is:

1. An entity relationship estimation apparatus comprising:
   a communication interface; and
   a processor that is communicatively coupled to communication interface,
   wherein the processor is configured to:
   acquire, using the communication interface, traffic data of a plurality of entities,
   establish pairs of entities among the plurality of the entities, wherein the plurality of entities includes an entity pair,
   calculate correlation values in windows of a predetermined time width for the traffic data between the pairs of entities,
   specifying a direction pair for the entity pair as a significant relationship based on a linear regression,
   determine that a relationship exist between the entity pair, wherein the relationship exists when:
      a first traffic direction pair of same directions for a first entity and a second entity, and a second traffic direction pair of different directions for the first entity and the second entity, are specified as direction pairs having the significant relationship, and
      the correlation values corresponding to the first traffic direction pair and the correlation values corresponding to the second traffic direction pair have different patterns, and
   estimate a type of the relationship between the entity pair based on the correlation values, wherein the type of the relationship includes a first type with traffic showing the relationship over a relatively long time, and a second type with the traffic showing the relationship for a relatively short time.

2. The entity relationship estimation apparatus according to claim 1, wherein the processor is further configured to:
   acquire the traffic data in inbound and outbound directions of the plurality of entities, and
   calculate the correlation values in the windows for each of direction pairs in which the traffic data of respective directions of the first entity and the second entity of the entity pair are combined.

3. The entity relationship estimation apparatus according to claim 1, wherein the processor is further configured to:
   calculate a similarity of the entity pair based on correlation values of the windows corresponding to a specified direction pair of the traffic data having the significant relationship, and to calculate a traffic volume of the entity pair based on traffic volumes of the windows corresponding to the specified direction pair of the traffic data having the significant relationship.

4. The entity relationship estimation apparatus according to claim 3, wherein the processor is further configured to calculate a degree of relationship of the entity pair based on results of the linear regression, a similarity of the entity pair, and a traffic volume of the entity pair.

5. The entity relationship estimation apparatus according to claim 1, wherein the processor is further configured to estimate whether or not the type of relationship between entities of the entity pair found in the direction pairs is classified as the second type, the direction pairs including the direction pair of the traffic data in which a descriptive statistics value based on correlation values of the windows of the entity pair equals to or smaller than a threshold, and the direction pair of the traffic data that has not been specified as the direction pair having the significant relationship for the entity pair which is assumed to be a candidate for the first type.

6. The entity relationship estimation apparatus according to claim 5, wherein, the processor is further configured to:
   determine a candidate for the second type for the direction pairs of the traffic data of the entity pair which is estimated whether it is classified as the second type based on whether or not the correlation values of a predetermined window exceeds a predetermined threshold, and to further estimate whether or not the relationship is classified as the second type and in which direction the relationship is classified as the second type based on a direction of the traffic data of the one or more direction pairs of the traffic data of the entity pair which has been determined as the candidate for the second type.

7. The entity relationship estimation apparatus according to claim 1, wherein, when the traffic data of at least one entity of the entity pair is mostly zero or a constant value, the processor is configured to exclude the relationship related a direction of the traffic data between the entities of the entity pair from the first type.

8. The entity relationship estimation apparatus according to claim 1, wherein the processor is further configured to display an estimated relationship between entities of the entity pair.

9. An entity relationship estimation method, the method comprising:
   acquiring, by a processor, traffic data of a plurality of entities, establish pairs of entities among the plurality of the entities, wherein the plurality of entities includes an entity pair,
   calculating, by the processor, correlation values in windows of a predetermined time width for the traffic data between the pairs of entities,
   specifying a direction pair for the entity pair as a significant relationship based on a linear regression,
   determining, by the processor, that a relationship exist between the entity pair, wherein the relationship exists when:
      a first traffic direction pair of same directions for a first entity and a second entity, and a second traffic direction pair of different directions for the first entity and the second entity, are specified as direction pairs having the significant relationship, and
      the correlation values corresponding to the first traffic direction pair and the correlation values corresponding to the second traffic direction pair have different patterns, estimating, by the processor, a type of the relationship between the entity pair based on the correlation values, wherein the type of the relationship includes a first type with traffic showing the relationship over a relatively long time, and a second type with the traffic showing the relationship for a relatively short time.

10. A non-transitory computer-readable recording medium that stores instructions for estimating an entity relationship, the instructions when executed by a processor cause the processor to execute a method comprising:

acquiring, by the processor, traffic data of a plurality of entities, establish pairs of entities among the plurality of the entities, wherein the plurality of entities includes an entity pair, calculating, by the processor, correlation values in windows of a predetermined time width for the traffic data between the pairs of entities, specifying a direction pair for the entity pair as a significant relationship based on a linear regression, determining, by the processor, that a relationship exist between the entity pair, wherein the relationship exists when:

a first traffic direction pair of same directions for a first entity and a second entity, and a second traffic direction pair of different directions for the first entity and the second entity, are specified as direction pairs having the significant relationship, and the correlation values corresponding to the first traffic direction pair and the correlation values corresponding to the second traffic direction pair have different patterns, estimating, by the processor, a type of the relationship between the entity pair based on the correlation values, wherein the type of the relationship includes a first type with traffic showing the relationship over a relatively long time, and a second type with the traffic showing the relationship for a relatively short time.

\* \* \* \* \*